March 30, 1926.
H. G. HOLMES
1,578,993
CLUTCH CONTROL MECHANISM FOR HOISTS
Filed Feb. 28, 1924
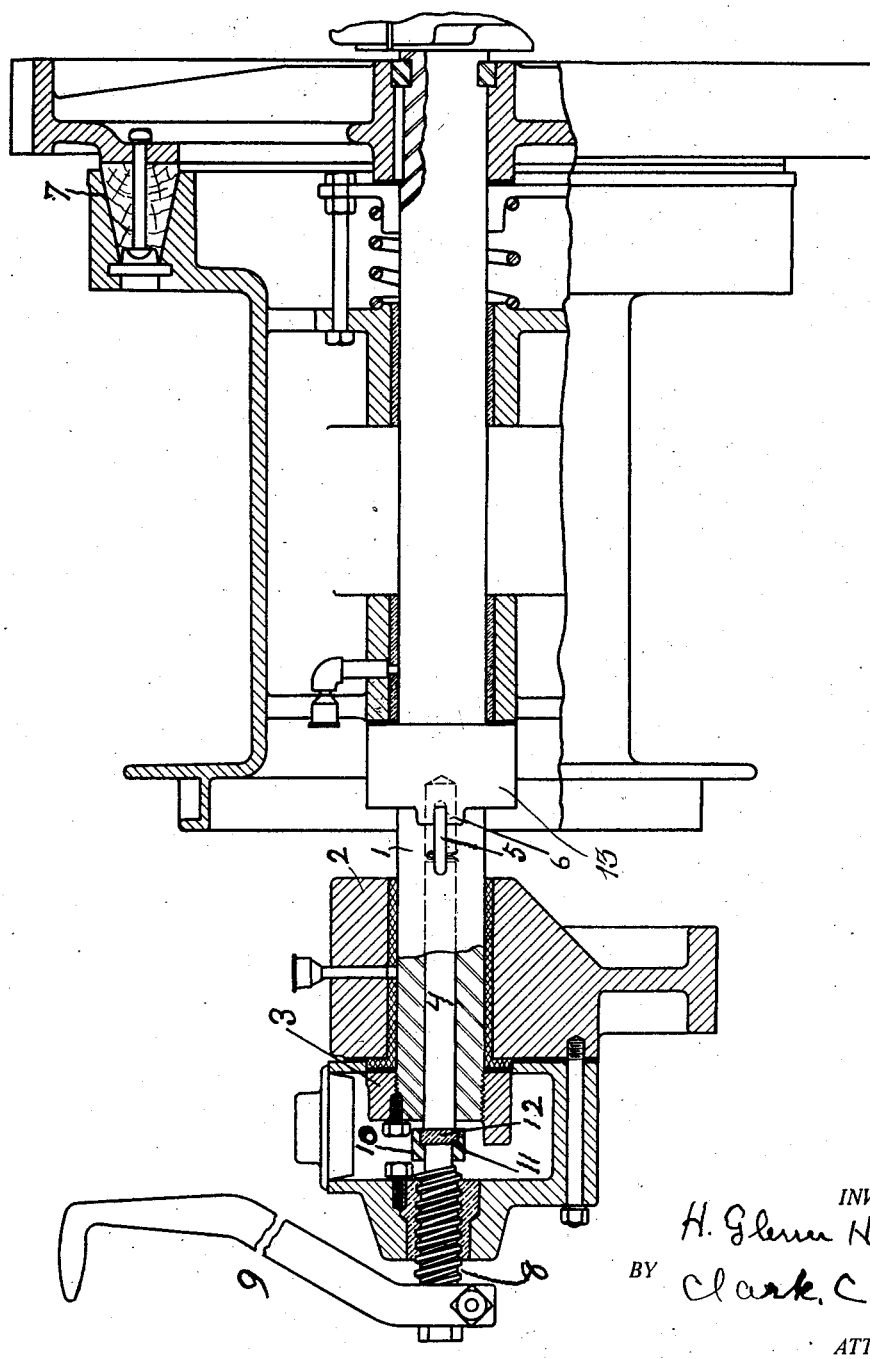
INVENTOR.
H. Glenn Holmes
BY Clark C. Wood
ATTORNEY.

Patented Mar. 30, 1926.

1,578,993

UNITED STATES PATENT OFFICE.

HERBERT GLENN HOLMES, OF LANSING, MICHIGAN, ASSIGNOR TO NOVO ENGINE COMPANY, OF LANSING, MICHIGAN, A CORPORATION OF MICHIGAN.

CLUTCH-CONTROL MECHANISM FOR HOISTS.

Application filed February 28, 1924. Serial No. 695,645.

To all whom it may concern:

Be it known that I, HERBERT GLENN HOLMES, a citizen of the United States, residing at Lansing, in the county of Ingham and State of Michigan, have invented a new and useful Improvement in Clutch-Control Mechanism for Hoists, of which the following is a specification.

My invention relates to hoists, and more especially to that type in which the hoist drum is operated by a clutch, the coacting members of which are carried by a gear and the hoisting drum, the clutch being forced into engagement by a screw or similar operating means. In hoists of this type, a considerable degree of pressure is required to hold the clutch in engagement and prevent slipping under the great strains of heavy loads, and serious difficulty has been found in making a device that will take the necessary thrust without an excessive amount of friction and excessive wear. The purpose of my device is to make a thrust member that shall be readily replaced when worn, that shall greatly reduce the amount of friction, and that shall not be subject to distortion under pressure. I attain these purposes by the means shown in the accompanying drawing, which shows the hoisting drum and driving gear and clutch of such a hoist, with a portion of its shaft and bearings. The drum shaft and other parts of the hoist itself are of any approved type and form no part of my invention, hence I do not further describe them. The main drum shaft 1 revolves in a bearing 2 and is provided with a collar 3 at its extremity. The center of the shaft 1 is bored out to receive a thrust pin 4 which is keyed by a key 5 to the shaft 1, and a notch 6 is formed in the extremity of the collar 13 so as to compel the shaft and the thrust pin to revolve together with the collar 13 and also to transmit the thrust of the thrust pin 4 to the collar 13. The thrust pin 4 receives the thrust occasioned by forcing the clutch 7 into engagement. The clutch 7 is forced into engagement by a screw 8 operated by a crank 9 or other suitable means. A collar 10 fits on the extremity of the screw 8 so as to be readily removed from it when desired, and a cavity 11 is formed in the end of the collar 10 to receive a block of anti-friction metal 12 of any suitable character which is thus interposed between the thrust pin 4 and the extremity of the screw 8 and takes the thrust of the screw. I prefer to use copper or some similar metal for the construction of this block, but any suitable material may be employed for this purpose without departing from my invention. The block 12 is made very slightly larger than the thrust pin 4 and the extremity of the screw 8, and being confined within the chamber 11 it can not be distorted by the pressure of the screw, yet when desired it can be readily driven out and replaced by simply removing the collar 10 from the screw 8 and driving out the block 12 and replacing it with a new one.

I am aware that anti-friction metals of various kinds have been used to take up the thrust between stationary and rotatable shafts, so I do not broadly claim that construction.

What I do claim, and desire to secure by Letters Patent is:

The combination in a hoist, with a hoisting drum, a clutch, a push rod, a thrust pin for bringing said clutch into action and actuating means in operating relationship to said thrust pin, of a soft metal thrust block between said means and thrust pin, and a removable collar mounted on said means and closely fitting said thrust block and retaining it in position.

H. GLENN HOLMES.